Patented June 8, 1926.

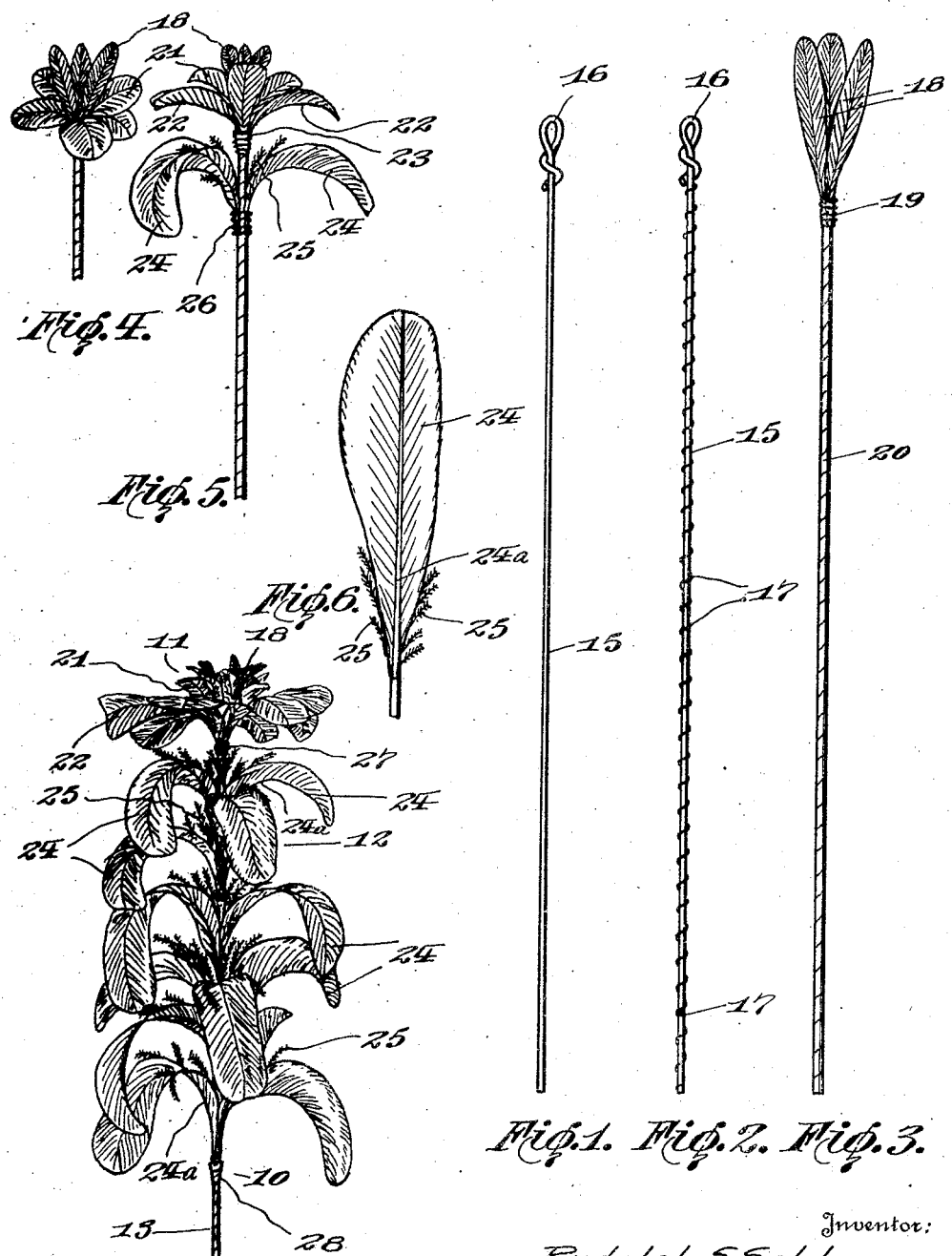

1,588,274

UNITED STATES PATENT OFFICE.

RUDOLPH S. SCHLOSSER, OF NEW YORK, N. Y.

ARTIFICIAL FLOWER AND METHOD OF MAKING SAME.

Application filed January 12, 1926. Serial No. 80,737.

This invention relates to improvements in artificial flowers and method of making same.

As an object of the invention it is the aim to provide an article of decorative value, the leaves and flower portion thereof being made from feathers especially treated for this purpose.

An additional object of this invention resides in the provision of such an article that may be manufactured and marketed at relatively small cost, thereby assuring its commercial success.

With these objects in view, together with others which will appear as the description proceeds, the invention resides in the novel formation, combination, and arrangement of parts, all as will be described more fully hereinafter, illustrated in the drawings, and particularly pointed out in the claims.

In said drawings:

Figure 1 shows the stem of my improved article being formed from a piece of steel wire or the like.

Fig. 2 illustrates a further step in my method of making the article.

Fig. 3 depicts the first step in the formation of the flower portion.

Fig. 4 is a perspective view of the flower portion formed from the stamens and petals.

Fig. 5 illustrates the complete flower.

Fig. 6 is a view of a feather to illustrate the method of preparing same for the flower and leaves; and Fig. 7 is a view showing the complete article.

Referring now more in particular to the accompanying drawings, wherein like characters of reference denote similar parts throughout the several views, the numeral 10 denotes generally my improved artificial flower, and comprises essentially the flower or bloom portion 11, the leaves 12 secured to the stalk 13.

For a clear understanding of the invention, the method of making the article will first be described in detail which will be followed by a description of the article in its finished state, as depicted in Fig. 7.

The foundation of the article, denoted by the numeral 15, comprises a piece of wire, in the nature of piano wire having the necessary spring and flexible qualities, yet sufficiently rigid for the purpose intended. At one end of this wire I form a loop 16 and then encircle the entire length of said wire with relatively thin wire 17, (see Fig. 2), said loop 16 and wire 17 serving to positively anchor certain parts, such as leaves, etc., in their respective positions.

The flower or bloom portion 11 is next fashioned by securing three or four small feathers to the wire 15 just below the loop 16, said feathers forming the stamen 18 of said flower. The stems of the small feathers may be bound by wire, as shown at 19, and then the entire wire 15 may be wrapped with thin pieces of green paper or the like, as indicated at 20, in order to simulate the stalk of the flower. The petals 21 (see Figs. 4 and 5) are now secured at the base of the stamen 18 and the calyx 22 added and secured to the stalk as indicated at 23. The complete flower portion is now formed and will be made of feathers presenting variegated hues and tints, in order to simulate certain well-known flowers.

The leaves 12 are also made from feathers suitably colored for that purpose, four or five of said feathers being grouped and secured to the stalk 13 at suitable intervals along the length thereof.

I now direct particular attention to a feature of my invention whereby a relatively stiff, upright feather is converted into a simulation of a drooping leaf. This is accomplished by cutting away or slicing a portion of the main steam 24ª of a feather 24 and placing them in an inverted position, that is, with the cut side of the main stem uppermost, on the stalk 13. The lower side portions of the feathers 24 are pulled away at intervals and stroked toward their bases to produce the fuzzy members 25, and as observed in Fig. 7, tend to simulate the growth of young leaves.

The feathers 22, representing the calyx, similarly have a portion of their main stems removed in order to present an outward graceful curve.

As previously pointed out, the feathers 24 form the leaves of my artificial flower, the lower portion of their stems being wrapped with wire as indicated at 26, Fig. 5, and a sufficient number of groupings being provided to extend substantially the entire length of the stalk 13. The wires encircling the feathers are covered with green paper, as at 27 for the bloom portion and as at 28 for the leaves, so that the entire stalk between the grouping of leaves and the bloom portion is covered with this material.

Figure 7 shows the complete article, which is exceedingly attractive in appearance and possessing decorative effects depending only on the judicious use of colored feathers and the individual taste of the maker.

Various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. An article of the class described having a bloom portion of feathers, the calyx thereof being formed of feathers having their main stems cut away to present a drooping appearance.

2. An article of the class described having a bloom portion, the calyx thereof being formed of feathers having their main stems cut away to present a drooping effect to said feathers and leaves formed of feathers positioned below said bloom portion.

3. An article of the class described comprising a stalk portion, a bloom portion arranged at the top of said stalk portion, said bloom portion being formed of colored feathers the lowermost feathers having their main stems cut away to present a drooping effect to said feathers and a plurality of groups of leaves positioned along said stalk portion, each leaf being formed from a feather having its main stem cut away for the purpose specified.

4. An article of the class described comprising a stalk portion, a bloom portion arranged at the top thereof, said bloom portion being formed from feathers having their lower stem portions secured to said stalk portion at a common point, and a plurality of groupings of leaves, each group being formed from feathers and having their lower stem portions secured to said stalk portion at a common point, each of said leaves having a portion of its stem cut away to present a drooping appearance and having its base portion frayed (25) to simulate young leaves.

5. The herein described method of making artificial flowers, which consists in forming a stalk portion of wire, securing feathers to the top thereof to form a bloom portion and securing groups of feathers to simulate leaves at intervals on said stalk.

6. The herein described method of making artificial flowers, which consists in forming a stalk portion of wire, encircling said stalk portion with a strand of thin wire, securing feathers to the top of said stalk portion to represent the stamen, petals and calyx of a flower, and securing a group of feathers simulating leaves at intervals along said stalk and then covering said stalk with green paper.

7. The herein described method of making artificial flowers, which consists in forming a stalk portion of wire, forming a loop in the top thereof, encircling said stalk portion with a strand of thin wire, securing feathers below the said loop, said feathers representing the stamen, petals and calyx of a flower and being secured at their stems by encircling with wire, securing a group of feathers having a portion of their stems cut away and lower portions frayed, to said stalk portions at suitable intervals therealong and then covering said stalk portion with green paper.

In testimony whereof I affix my signature.

RUDOLPH S. SCHLOSSER.